United States Patent
Jeong et al.

(10) Patent No.: US 8,797,420 B2
(45) Date of Patent: Aug. 5, 2014

(54) NON-REAL TIME IMAGE PROCESSING METHOD, IMAGE CAPTURING APPARATUS APPLYING THE SAME, AND IMAGE PROCESSING SYSTEM

(75) Inventors: Young-hoon Jeong, Suwon-si (KR); Byung-sun Choi, Suwon-si (KR); Jae-sung Jun, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 13/432,466

(22) Filed: Mar. 28, 2012

(65) Prior Publication Data

US 2012/0249839 A1    Oct. 4, 2012

(30) Foreign Application Priority Data

Mar. 29, 2011    (KR) ................. 10-2011-0028295

(51) Int. Cl.
    *H04N 5/235*    (2006.01)
(52) U.S. Cl.
    USPC ................. 348/222.1; 348/211.2

(58) Field of Classification Search
    USPC .......... 348/207.1, 211, 2, 222.1, 223.1, 211.2
    See application file for complete search history.

(56) References Cited

U.S. PATENT DOCUMENTS

| | | | | |
|---|---|---|---|---|
| 6,148,149 | A * | 11/2000 | Kagle | 348/231.99 |
| 8,040,390 | B2 * | 10/2011 | Nakami | 348/223.1 |
| 2006/0125932 | A1 * | 6/2006 | Lu et al. | 348/222.1 |
| 2007/0075971 | A1 * | 4/2007 | Chun | 345/158 |

* cited by examiner

*Primary Examiner* — Gevell Selby
(74) *Attorney, Agent, or Firm* — Stanzione & Kim, LLP

(57) ABSTRACT

An image processing method, an image capturing apparatus applying the same, and an image processing system. The image processing method includes capturing an image, generating intermediate data by primarily processing the captured image, generating final processing data including instructions to initiate a final process to convert the intermediate data into final data, and transmitting the intermediate data and the final processing data to an external image processing apparatus to perform the final process. Accordingly, an image quality of the image is improved as compared to an image quality of a final image processed in real time by a conventional image capturing apparatus, and a variety of functions can be provided.

19 Claims, 5 Drawing Sheets

NON-REAL TIME IMAGE PROCESSING METHOD, IMAGE CAPTURING APPARATUS APPLYING THE SAME, AND IMAGE PROCESSING SYSTEM

CROSS-REFERENCE TO RELATED APPLICATIONS

This application claims priority under 35 U.S.C. §119(a) from Korean Patent Application No. 10-2011-0028295, filed on Mar. 29, 2011, in the Korean Intellectual Property Office, the disclosure of which is incorporated herein by reference it its entirety.

BACKGROUND OF THE INVENTION

1. Field of the Invention

The present general inventive concept generally relates to an image processing method, an image capturing apparatus applying the same, and an image processing system, and more particularly to an image processing method to process an image within an external image processing apparatus, an image capturing apparatus applying the same, and an image processing system.

2. Description of the Related Art

A conventional mobile image capturing apparatus includes various functions that can be selected by a user, and transmits data that is generated from the selected function to an external appliance, such as a computer. The transmitted data may be data that does not require reprocessing, such as a still image, a moving image clip, etc.

For example, a digital camera allows a user to select functions such as still-image capturing, moving-image capturing, high-speed continuous shot, etc., and outputs data as JPEG, GIF, TIFF, PNG, BMP or MPEG files. The output data is stored in a storage device, or is transmitted to an external computer or a server where it may be modified.

However, the conventional mobile image capturing apparatus, unlike a tabletop-mounted image processing apparatus (e.g., a computer), is limited in CPU capability and memory storage space, and thus image processing functions and performance quality are limited. Due to such limitations, the conventional mobile image capturing apparatus is designed to perform simple functions in comparison to the tabletop-mounted image processing apparatus.

Further, due to limitations regarding algorithm simplification, optimization, and overall performance quality, the conventional mobile image capturing apparatus, such as a digital camera, a camcorder, a portable phone, etc., excludes advanced functions to avoid overburdening the conventional mobile image capturing apparatus' CPU or memory.

SUMMARY OF THE INVENTION

The present general inventive concept provides an image processing method, an image capturing apparatus applying the same, and an image processing system, which can transmit intermediate data that is generated through primary processing of a captured image and final processing information including instructions to initiate a final process to convert the intermediate data into final data, to an external image processing apparatus, and instruct the external image processing apparatus to perform the final process.

Additional aspects and utilities of the present general inventive concept will be set forth in part in the description which follows and, in part, will be obvious from the description, or may be learned by practice of the general inventive concept.

The foregoing and/or other features and utilities of the present general inventive concept may be achieved by an image processing method of an image capturing apparatus including capturing an image, generating intermediate data by primarily processing the captured image, generating final processing data including instructions to initiate a final process to convert the intermediate data into final data, and transmitting the intermediate data and the final processing data to an external image processing to perform the final process.

The image processing method may further include displaying a User Interface (UI) to set at least one of image quality data of the final data and special effect data of the final data which are included in the final processing data.

The UI may include at least one state adjustment to set the image quality data of the final data, and the generation of the final processing data may generate the final processing data of the intermediate data so that an adjustment icon of the at least one state adjustment bar moves in a first direction to improve an image quality of the final data.

The UI may include an image quality selection menu to allow a user to select a level corresponding to the image quality data of the final data.

The UI may set detailed image-setting functions of the image quality data in order to set the image quality data of the final data.

The UI may include at least one of a real time selection portion to set a real time processing mode in which the image capturing apparatus performs the final process with respect to the detailed image-setting functions in real time, an automatic selection portion to set an automatic processing mode in which the detailed image-setting items are automatically set according to image capturing conditions when the image is captured, and a level selection portion to set the detailed image-setting functions of the image quality data.

The image processing method may further include displaying the intermediate data obtained by primarily processing the captured image.

The intermediate data obtained by primarily processing the captured image may be a raw data file, and the final data obtained by performing the final process with respect to the intermediate data may be one of a JPEG file and an MPEG file.

The final processing data may include at least one of the image quality data of the final data that is generated through the final process, special effect data that is applied to the final data, and protocol data to allow the capturing apparatus to communicate with the image processing apparatus to perform the final process of the intermediate data.

The foregoing and/or other features and utilities of the present general inventive concept may also be achieved by an image capturing apparatus including an image capturing unit to capture an image, an image processing unit to generate intermediate data by primarily processing the image captured by the image capturing unit, a transceiver unit connected to an external image processing apparatus, and a control unit generate final processing data including instructions to initiate a final process to convert the intermediate into final data and to transmit the intermediate data and the final processing data to the external image processing apparatus through the transceiver unit.

The image capturing apparatus may further include a User Interface (UI) generation unit to generate a UI, wherein the control unit controls the UI generation unit to generate the UI to set at least one of image quality data of the final data and special effect data of the final data which are included in the final processing data.

The UI may include at least one state adjustment bar to set the image quality data of the final data, and the control unit may generate the final processing information of the intermediate data so that an adjustment icon of the at least one state adjustment bar moves in a first direction according to a user's input to improve an image quality of the final data.

The UI may include an image quality selection menu to allow a user to select a level corresponding to the image quality data of the final data.

The UI may set detailed image-setting functions of the image quality data in order to set the image quality data of the final data.

The UI may include at least one of a real time selection portion to set a real time processing mode in which the image capturing apparatus performs the final process with respect to the detailed image-setting functions in real time, an automatic selection portion to set an automatic processing mode in which the final processing data of the detailed image-setting functions are automatically set according to image capturing conditions when the image is captured, and a level selection portion to set the detailed image-setting functions of the image quality data.

The image capturing apparatus may further include a display unit, wherein the control unit controls the display unit to display the intermediate data obtained by primarily processing the captured image.

The intermediate data obtained by primarily processing the captured image may be a raw data file, and the final data obtained by performing the final process with respect to the intermediate data may be one of a JPEG file and an MPEG file.

The final processing data may include at least one of the image quality data of the final data that is generated through the final process, special effect data that is applied to the final data, and protocol data to allow the image capturing device to communicate with the image processing apparatus to perform the final process of the intermediate data.

The foregoing and/or other features and utilities of the present general inventive concept may also be achieved by an image processing system including an image capturing apparatus to capture an image, to generate intermediate data by primarily processing the captured image, to generate final processing data including instructions to initiate a final process to convert the intermediate data into final data, and to transmit the generated intermediate data and the final processing data, and an image processing apparatus to receive the intermediate data and the final processing data transmitted from the image capturing apparatus, and to perform the final process of the intermediate data as to generate the final data.

The transceiver unit may be connected to the external image processing apparatus wirelessly.

The foregoing and/or other features and utilities of the present general inventive concept may also be achieved by an image processing system including an image capturing apparatus to capture an image and generate a raw data file corresponding to the captured image, a user interface to allow a user to input image quality settings, and an image processing apparatus to receive the raw data file from the image capturing apparatus and to modify the raw data file based on the user's input.

The image processing apparatus may include a processing unit to convert the modified raw data file into one of a JPEG file and an MPEG file.

The user interface may include at least one of a state adjustment bar, a check box, and a radio button.

The user interface may include at least one of a menu to modify the image quality settings individually and a menu to modify the image quality settings simultaneously.

The image quality settings may include at least one of Noise Reduction, Low Light Shot, High Dynamic Range, Blur Detection, Blur Correction, Auto Contrast, and Auto Brightness.

The input image quality settings may be generated as modification processing data and the image processing apparatus may receive the modification processing data together with the raw data.

The modification processing data and raw data may be received by the image processing apparatus wirelessly.

BRIEF DESCRIPTION OF THE DRAWINGS

The above and/or other features of the present general inventive concept will be apparent and more readily appreciated from the following description of the exemplary embodiments, taken in conjunction with the accompanying drawings, in which.

DETAILED DESCRIPTION OF THE PREFERRED EMBODIMENTS

Figure 1:
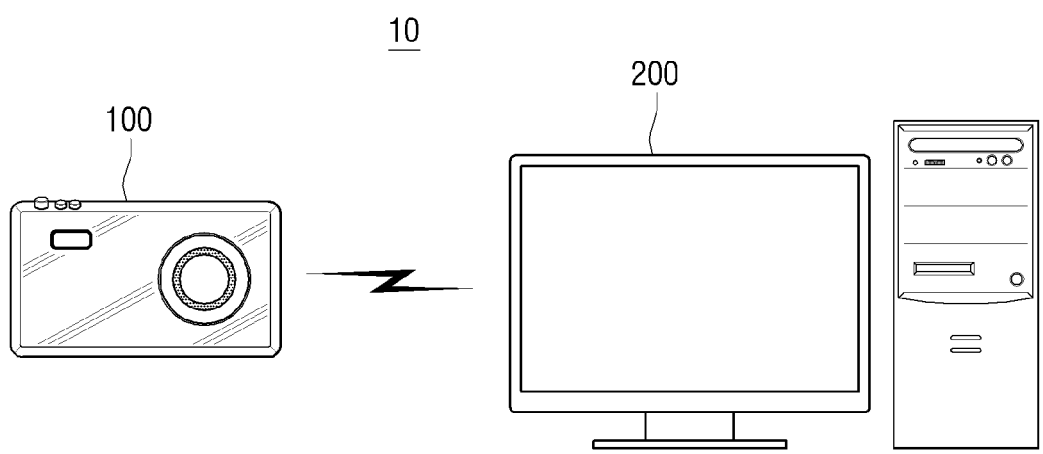
FIG. 1 is a diagram illustrating an image processing system according to exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a diagram illustrating an image processing system 10 according to exemplary embodiments of the present general inventive concept. Referring to FIG. 1, the image processing system 10 includes an image capturing apparatus 100 to capture an image, and an image processing apparatus 200 to perform image processing on the captured image. The image capturing apparatus 100 may include a digital camera, a digital camcorder, a cellular phone, or a mobile device capable of capturing an image, but is not limited thereto. The image processing apparatus 200 may include a computer, laptop, or a high-performance tabletop-mounted image processing apparatus, but is not limited thereto.

The image capturing apparatus 100 captures an image through an image capturing unit, and generates intermediate data by primarily processing the captured image. The intermediate data includes image data that has not been modified or manipulated. For example, the intermediate data may include a raw data file.

Further, the image capturing apparatus 100 may generate final processing data including instructions to initiate a final process to convert the intermediate data into final data. The final data includes image data that has been processed, modified, or manipulated (e.g., a user sets image quality data or selects a special effect function). For example, the final data may include an MPEG file or a JPEG file.

The final processing data may include image quality data of the final data that is generated during the final process, special effect data that is applied to the final data, and protocol data to allow the image capturing apparatus 100 to communicate with an external image processing apparatus, such as the image processing apparatus 200, to perform the final processing of the intermediate data.

Further, the image capturing apparatus 100 may set the image quality data of the final data, special effect data that is applied to the final data, etc., which are included in the final processing data, according to the user's input. A User Interface (UI) to set the image quality data of the final data, the special effect data that is applied to the final data, etc., will be described in detail with reference to FIGS. 4A through 4D.

Further, the image capturing apparatus 100 transmits the generated intermediate data and the final processing data to the external image processing apparatus 200 through a transceiver unit so that the external image processing apparatus 200 performs the final processing of the intermediate data. The intermediate data and the final processing data may be transmitted to the external image processing apparatus 200 via a wired interface, such as a USB cable, or a wireless interface, such as a Bluetooth module.

The external image processing apparatus 200 generates final data using the intermediate data and the final processing data received from the image capturing apparatus 100. Specifically, the external image processing apparatus 200 performs the final process with respect to the intermediate data by applying the image quality data final data and the special effect data, which are included in the final processing data, to the intermediate data, and generates the final data.

The above-described image processing system 10 generates an image with an image quality superior to an image quality of an image processed in real time by a conventional image capturing apparatus, and the image capturing apparatus 100 can provide a user with a variety of functions.

Hereinafter, the image capturing apparatus 100 and the image processing apparatus 200 will be described with reference to FIGS. 2 and 3.

Figure 2:
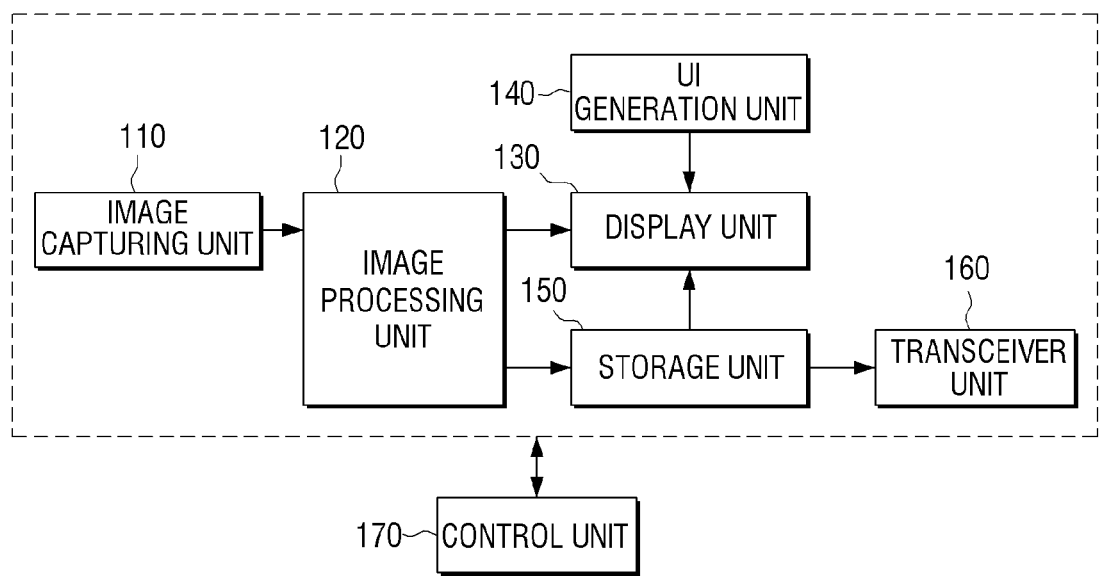
FIG. 2 is a block diagram illustrating a configuration of an image capturing apparatus according to an exemplary embodiment of the present general inventive concept.

FIG. 2 is a block diagram illustrating a configuration of the image capturing apparatus 100 according to an exemplary embodiment of the present general inventive concept. Referring to FIG. 2, the image capturing apparatus 100 includes an image capturing unit 110, an image processing unit 120, a display unit 130, a UI generation unit 140, a storage unit 150, a transceiver unit 160, and a control unit 170.

The image capturing unit 110 captures a still image or a moving image through a lens (not illustrated). Specifically, the image capturing unit 110 forms an image on a sensor region (not illustrated) using the lens. Further, the image capturing unit 110 performs photoelectric conversion, that is, converts light incident through the lens into an electric signal using an image sensor (not illustrated).

The image processing unit 120 receives the captured image from the image capturing unit 110 and performs primary data processing on the captured image to acquire intermediate data. The intermediate data includes image data that has not been modified or manipulated. For example, the intermediate data may include a raw data file.

The intermediate data may be stored in the storage unit 150 or may be displayed on the display unit 130. In addition, the intermediate data is transmitted to the external image processing apparatus 200 through the transceiver unit 160 together with the final processing data including instructions to initiate the final process to convert the intermediate data into the final data.

The display unit 130 displays the image that is processed by the image processing unit 120. In particular, the display unit 130 can display the intermediate data that is primarily processed by the image processing unit 120. Further, the display unit 130 can display the User Interface generated by the UI generation unit 140 and the final data that is processed by and received from the external image processing apparatus 200.

The UI generation unit 140 generates the User Interface corresponding to various settings in the image capturing apparatus 100. The generated User Interface will be later described in detail with reference to FIGS. 4A through 4D.

The storage unit 150 stores the image data that is processed by the image processing unit 120 in a compressed form. In particular, the storage unit 150 can compress and store the intermediate data that is primarily processed by the image processing unit 120. The storage unit 140 may include a nonvolatile memory, a hard disk, etc.

The transceiver unit 160 communicates with an external apparatus in order to transmit and/or receive various kinds of image data. In particular, the transceiver unit 160 can transmit the intermediate data and the final processing data to the external image processing apparatus 200.

The transceiver unit 160 may include a wire interface unit, such as a USB cable, or a wireless interface unit, such as a Bluetooth module.

The control unit 170 receives a user command transferred from a user input unit (not illustrated), and controls an operation of the image capturing apparatus 100 according to the received user command.

In particular, the control unit 170 generates the final processing data including instructions to initiate the final process to convert the intermediate data that is primarily processed by the image processing unit 120 into the final data.

The control unit 170 can control the UI generation unit 140 to generate a User Interface to set at least one of the image quality data of the final data and the special effect data of the final data, which are included in the final processing data.

Figure 4A:
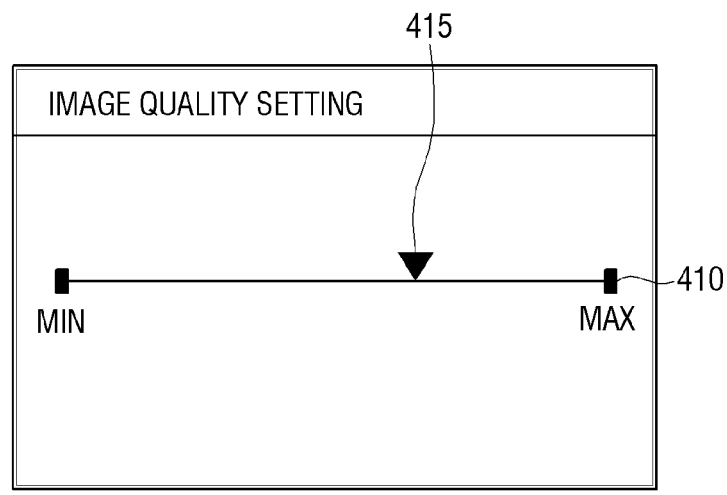
FIGS. 4A through 4D are diagrams illustrating a User Interface provided in an image capturing apparatus according to an exemplary embodiment of the present general inventive concept.

The generated User Interface is hereinafter described with reference to FIGS. 4A through 4D. FIG. 4A is a diagram illustrating a User Interface that is provided in the image capturing apparatus 100, according to an exemplary embodiment of the present general inventive concept.

Referring to FIG. 4A, the generated User Interface includes a state adjustment bar 410 to set an image quality of the final data that is included in the final processing data. The image quality of the final data that is included in the final processing data may include an attribute of the final data, an image quality process improvement function, etc. For example, the attribute of the final data may include information regarding an image quality size of the final data, resolution, contrast, and brightness, but is not limited thereto, and the image quality process improvement function may include information regarding noise reduction and blur correction, but is not limited thereto.

For example, referring to FIG. 4A, when an adjustment icon 415 of the state adjustment bar 410 is moved in a rightward direction in response to the user's input (i.e., toward "MAX", as illustrated in FIG. 4A), the control unit 170 generates image quality process data so that the image quality of the final data is improved.

More specifically, when the adjustment icon 415 of the state adjustment bar 410 is moved in the rightward direction, the image quality size of the final data is enlarged, the resolution increases, and a contrast ratio increases. Further, the noise reduction amount that is applied to the final data is increased, and the blur correction amount is also increased.

In contrast, when the adjustment icon 415 of the state adjustment bar 410 is moved in the leftward direction in response to the user's input (i.e., toward "MIN"), the control unit 170 generates image quality process data so that the image quality of the final data decreases. However, when the adjustment icon 415 of the state adjustment bar 410 is moved in the leftward direction, the image quality of the final data decreases and capacitance to process the image quality is reduced to make prompt processing possible.

For example, if the adjustment icon 415 of the state adjustment bar 410 is moved in the leftward direction, the image quality size of the final result is reduced, the resolution is lowered, and the contrast ratio is lowered. Further, the noise reduction amount that is applied to the final data is decreased, and the blur correction amount is also decreased.

As described above, by adjusting various types of image quality data with one state adjustment bar 410, a user can select a desired image quality level and the processing speed more easily.

Figure 4B:
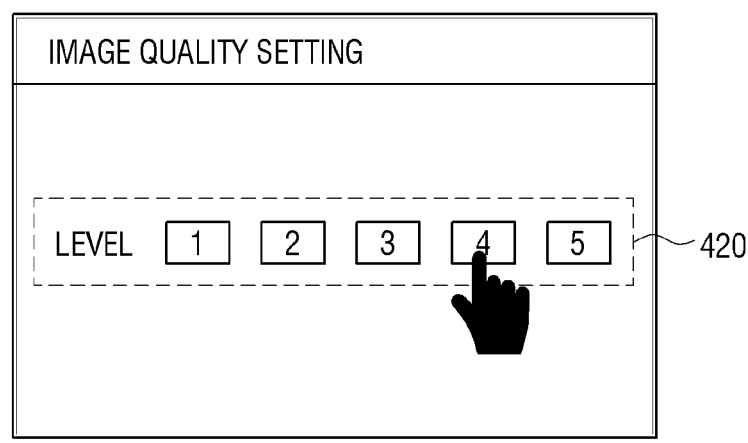

FIG. 4B is a diagram illustrating a User Interface that is provided in the image capturing apparatus according to another embodiment of the present general inventive concept.

As illustrated in FIG. 4B, the generated User Interface includes an image quality selection menu 420 to allow a user to select the image quality of the final data. The image quality selection menu 420 enables a plurality of levels to be set so that the image quality data of the final data can be easily selected. As a higher level is selected, the control unit 170 generates the image quality process data so that the image quality of the final data improves. In contrast, as a lower level is selected, the image quality of the final data decreases, but the control unit 170 is able to generate image quality process data with a high processing speed.

For example, "LEVEL 4" can provide the final data with better image quality than that of "LEVEL 2". That is, the image size of the final data at "LEVEL 4" is larger than the image size of the final data at "LEVEL 2", and the resolution of the final data at "LEVEL 4" is higher than that of the final data at "LEVEL 2". Further, the contrast ratio of the final data at "level 4" is higher than the contrast ratio of the final data at "LEVEL 2", and the noise reduction amount of the final data at "LEVEL 4" is larger than the noise reduction amount of the final data at "LEVEL 2". Moreover, the blur correction amount of the final data at "LEVEL 4" is larger than the blur correction amount of the final data at "LEVEL 2".

As described above, by adjusting various types of image quality data through one image quality selection menu 420, the user can select a desired image quality level more easily.

Figures 4C, 4D:
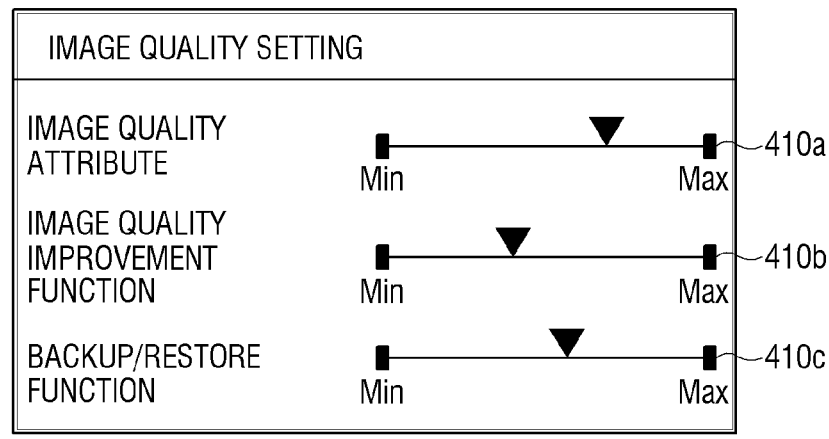

FIG. 4C is a diagram illustrating a User Interface that is provided in the image capturing apparatus 100 according to another embodiment of the present general inventive concept.

The User Interface illustrated in FIG. 4C includes a plurality of state adjustment bars 410a through 410c, which are similar to the state adjustment bar 410 as illustrated in FIG. 4A. However, in FIG. 4A, various types of image quality data is simultaneously set through one state adjustment bar 410, whereas in FIG. 4C, each type of image quality data can be set separately.

For example, referring to FIG. 4C, the image quality data related to the "IMAGE QUALITY ATTRIBUTE" may be set using a first state adjustment bar 410a, the image quality data related to the "IMAGE QUALITY IMPROVEMENT FUNCTION" may be set using a second state adjustment bar 410b, and the "BACKUP/RESTORE FUNCTION" may be set using a third state adjustment bar 410c.

Referring to FIG. 4A, by adjusting the various types of image quality data through one state adjustment bar 410, the image quality data can be adjusted more easily, while in FIG. 4C, by adjusting the various types of image quality data through a plurality of state adjustment bars 410a, 410b, and 410c, respectively, a user may individually select and alter a particular type of image quality data.

FIG. 4D is a diagram illustrating a User Interface that is provided in the image capturing apparatus 100 according to another embodiment of the present general inventive concept.

The User Interface illustrated in FIG. 4D is a User Interface to allow a user to individually select a plurality of detailed image-setting functions 460. More specifically, as illustrated in FIG. 4D, the generated User Interface includes a plurality of User Interface selection portions, including a real time selection portion 430 to set a real time processing mode in which the image capturing apparatus performs the final process with respect to the detailed image-setting functions 460 in real time, an automatic selection portion 440 to set an automatic processing mode in which the final processing data of the detailed image-setting functions 460 are automatically set according to image capturing conditions when the image is captured, and a level selection portion 450 to allow a user to manually select the level of the image quality information corresponding to each of the detailed image-setting functions 460. To facilitate selection, the real time selection portion 430, the automatic selection portion 440, and the level selection portion 450 may include option buttons such as check boxes and radio buttons, but are not limited thereto.

Referring to FIG. 4D, the plurality of detailed image-setting functions 460 that a user may select includes, but is not limited to, "Noise Reduction," "Low Light Shot," "High Dynamic Range," "Blur Detection," "Blur Correction," "Auto Contrast," and "Auto Brightness."

The real time selection portion 430 allows a corresponding one of the plurality of detailed image-setting functions 460 to be processed in real time by the image capturing apparatus 100. For example, when the noise reduction function is set in a real time processing mode, the data corresponding to the noise reduction function is not included in the image quality process data, but is performed in real time according to a value set by the image capturing apparatus 100.

The UI automatic selection portion 440 allows a corresponding one of the plurality of detailed image-setting functions 460 to be set automatically according to capturing conditions. For example, when the automatic contrast function is set in an automatic processing mode, the image capturing apparatus 100 automatically sets the automatic contrast value in consideration of the image capturing time zone, the brightness at the time of image capturing, etc.

The level selection portion 450 is similar to the image quality section menu 420 as described in FIG. 4B. However, unlike the image quality selection menu 420 illustrated in FIG. 4B, the level selection portion 450 of FIG. 4D allows a user to individually select the image quality of the each of the various particular detailed image-setting functions 460.

By using the image quality data of the final data and the special effect data, which are set through the User Interfaces as illustrated in FIGS. 4A through 4D, the control unit 170 can generate the image quality process data.

Further, the control unit 170 may control the display unit 130 to display the intermediate data that is obtained by primarily processing the captured image. Accordingly, the user can confirm the displayed image is correct even if the displayed image is not the modified final data.

Further, the control unit 170 operates to transmit the intermediate data and the final processing data to the external image processing apparatus 200 through the transceiver unit 160 so that the external image processing apparatus 200 can perform the final process with respect to the intermediate data.

The above-described image capturing apparatus 100 generates an image with an image quality superior to an image quality of a final image processed in real time by a conventional image capturing apparatus, and the image capturing apparatus 100 can provide a user with a variety of functions.

Figure 3:
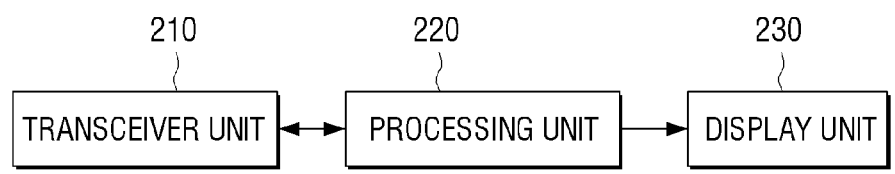
FIG. 3 is a block diagram illustrating a configuration of an image processing apparatus according to an exemplary embodiment of the present general inventive concept.

FIG. 3 is a block diagram illustrating the configuration of the image processing apparatus 200 according to an exemplary embodiment of the present general inventive concept. Referring to FIG. 3, the image processing apparatus 200 includes a transceiver unit 210, a processing unit 220, and a display unit 230.

The transceiver unit 210 communicates with the image capturing apparatus 100 of FIG. 1. In particular, the transceiver unit 210 receives the final processing data including instructions to initiate the final process to convert the intermediate data into the final data in the image capturing apparatus 100.

The transceiver unit 210 transmits the received intermediate data and the final processing data to the processing unit 220.

The processing unit 220 performs the final process with respect to the intermediate data by applying the image quality data of the final data and the special effect data of the final data, which are included in the final processing information, to the intermediate data. As a result of performing the final process, the processing unit 220 generates the final data.

The generated final data may be displayed by the display unit 230, and may be transmitted again to the image capturing apparatus 100 through the transceiver unit 210.

Accordingly, by processing the image through the image processing apparatus 200 having superior performance than the image capturing apparatus 100, the image processing apparatus 200 can provide the user with an image with superior image quality, and the image capturing apparatus 100 can provide a user with a variety of functions.

Figure 5:
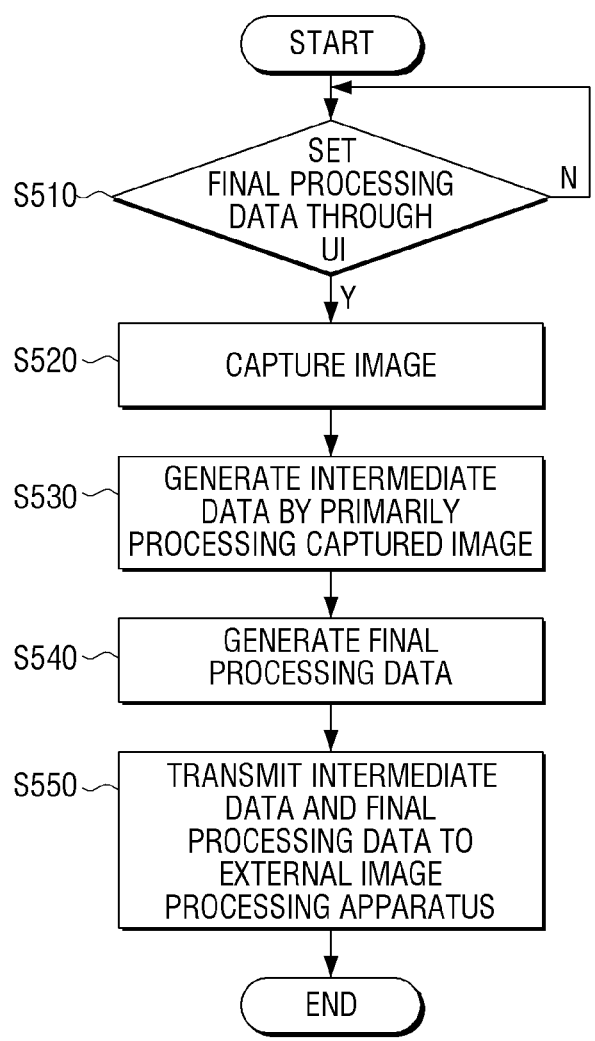
FIG. 5 is a flowchart illustrating an image processing method of an image capturing apparatus according to an exemplary embodiment of the present general inventive concept.

Hereinafter, referring to FIGS. 4A through 5, an image processing method of the image capturing apparatus 100 will be described. FIG. 5 is a flowchart illustrating an image processing method of the image capturing apparatus 100 according to an exemplary embodiment of the present general inventive concept.

The image capturing apparatus 100 sets the final processing data through the User Interface (UI) (operation S510). The final processing data includes instructions to initiate the final process to convert the intermediate data that is obtained by primarily processing the captured image into the final data. Further, the setting of the final processing data through the User Interface may be performed when the image capturing apparatus 100 is initially powered-on, or when a user desires to modify the final processing data.

After the final processing information is set, the image capturing apparatus 100 captures an image from a specified object (operation S520).

The image capturing apparatus 100 generates the intermediate data by primarily processing the captured image (operation S530). As stated above, the intermediate data includes image data that has not been modified or manipulated. For example, the intermediate data may be a raw data file.

The image capturing apparatus 100 generates the final processing data including instructions to initiate the final process to convert the primarily processed intermediate data into the final data (operation S540). As described above, the final data includes image data to which the image quality data set by the user, the special effect function, etc., is applied. For example, the final data may include an MPEG file or a JPEG file. Here, the final processing data may include the image quality data of the final data that is generated through the final process, special effect data that is applied to the final data, and protocol data to allow the image capturing apparatus 100 to communicate with the external image processing apparatus 200 to perform final processing of the intermediate data.

Further, the image capturing apparatus 100 transmits the generated intermediate data and the final processing data to the external image processing apparatus 200 through the transceiver unit so that the external image processing apparatus 200 performs the final processing of the intermediate data (operation S550). The intermediate data and the final processing data may be transmitted to the external image processing apparatus 200 via a wire interface, such as a USB cable, or a wireless interface, such as a Bluetooth module.

The above-described image processing method generates an image with an image quality superior to an image quality of an image processed in real time by a conventional image capturing apparatus, and the image capturing apparatus 100 can provide a user with a variety of functions.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method of an image capturing apparatus, comprising:
    capturing an image;
    generating intermediate image data by primarily processing the captured image;
    displaying a graphic user interface (GUI) including an image quality selection menu to set an image quality level of a final image;
    receiving a user input to set the image quality level of the final image;
    generating final processing data including the set image quality level of the final image based on the received user input; and
    transmitting the intermediate image data and the final processing data to an external image processing apparatus to apply the final processing data to the intermediate image data to generate the final image.

2. The image processing method as claimed in claim 1, wherein the GUI further comprises a special effect setting menu to set the special effect of the final image, and the generated final processing data comprises the special effect information of the final image in response to a user input to set the special effect of the final image through the special effect setting menu.

3. The image processing method as claimed in claim 2, wherein:
    the UI includes at least one state adjustment bar to set the image quality data of the final data, and
    the generation of the final processing data generates the final processing data of the intermediate data so that an adjustment icon of the at least one state adjustment bar moves in a first direction to improve an image quality of the final data.

4. The image processing method as claimed in claim 2, wherein the UI sets detailed image-setting functions of the image quality data in order to set the image quality data of the final data.

5. The image processing method as claimed in claim 4, wherein the UI includes at least one of a real time selection portion to set a real time processing mode in which the image capturing apparatus performs the final process with respect to the detailed image-setting functions in real time, an automatic selection portion to set an automatic processing mode in which the detailed image-setting functions are automatically set according to image capturing conditions when the image is captured, and a level selection portion to set the detailed image-setting functions of the image quality data.

6. The image processing method as claimed in claim 1, further comprising displaying the intermediate data obtained by primarily processing the captured image.

7. The image processing method as claimed in claim 1, wherein the intermediate data obtained by primarily processing the captured image is a raw data file, and the final data obtained by performing the final process with respect to the intermediate data is one of a JPEG file and an MPEG file.

8. The image processing method as claimed in claim 1, wherein the final processing data includes at least one of the image quality data of the final data that is generated through the final process, special effect data that is applied to the final data, and protocol data to allow the image capturing apparatus to communicate with the image processing apparatus to perform the final process of the intermediate data.

9. The image processing method of claim 1, wherein the image characteristic of the final image comprises at least one of image quality of the final image and image special effect of the final image.

10. An image capturing apparatus, comprising:
an image capturing unit to capture an image;
an image processing unit to generate intermediate image data by primarily processing the image captured by the image capturing unit;
a display unit to display a graphic user interface (GUI) including an image quality selection menu to set an image quality level of a final image and to receive a user input to set the image quality level of the final image;
a transceiver unit connected to an external image processing apparatus; and
a control unit to generate final processing data including the set image quality level of the final image based on the received user input and to transmit the intermediate image data and the final processing data to the external image processing apparatus through the transceiver unit to apply the final processing data to the intermediate image data to generate the final image.

11. The image capturing apparatus as claimed in claim 10, further comprising a User Interface (UI) generation unit to generate a UI,
wherein the control unit controls the UI generation unit to generate the UI to set at least one of image quality data of the final data and special effect data of the final data which are included in the final processing data.

12. The image capturing apparatus as claimed in claim 11, wherein the UI includes at least one state adjustment bar to set the image quality data of the final data, and
the control unit generates the final processing data of the intermediate data so that an adjustment icon of the at least one state adjustment bar moves in a first direction according to a user's input to improve an image quality of the final data.

13. The image capturing apparatus as claimed in claim 11, wherein the UI sets detailed image-setting functions of the image quality data in order to set the image quality data of the final data.

14. The image capturing apparatus as claimed in claim 13, wherein the UI includes at least one of a real time selection portion to set a real time processing mode in which the image capturing apparatus performs the final process with respect to the detailed image-setting functions in real time, an automatic selection portion to set an automatic processing mode in which the final processing data of the detailed image-setting functions are automatically set according to image capturing conditions when the image is captured, and a level selection portion to set the detailed image-setting functions of the image quality data.

15. The image capturing apparatus as claimed in claim 10, further comprising a display unit,
wherein the control unit controls the display unit to display the intermediate data obtained by primarily processing the captured image.

16. The image capturing apparatus as claimed in claim 10, wherein the intermediate data obtained by primarily processing the captured image is a raw data file, and the final data obtained by performing the final process with respect to the intermediate data is one of a JPEG file and an MPEG file.

17. The image capturing apparatus as claimed in claim 10, wherein the final processing data includes at least one of the image quality data of the final data that is generated through the final process, special effect data that is applied to the final data, and protocol data to allow the image capturing device to communicate with the image processing apparatus to perform the final process of the intermediate data.

18. The image capturing apparatus of claim 10, wherein the transceiver unit is connected to the external image processing apparatus wirelessly.

19. An image processing system, comprising:
an image capturing apparatus to capture an image, to generate intermediate image data by primarily processing the captured image, to display a graphic user interface (GUI) including an image quality selection menu to set an image quality level of a final image, to receive a user input to set the image quality level of the final image, to generate final processing data including the set image quality level of the final image based on the received user input, and to transmit the generated intermediate image data and the final processing data; and
an image processing apparatus to receive the intermediate data and the final processing data transmitted from the image capturing apparatus, and to apply the final processing data to the intermediate image data to generate the final image.

* * * * *